United States Patent [19]

Langlais et al.

[11] Patent Number: 4,822,416

[45] Date of Patent: Apr. 18, 1989

[54] HIGH SOLIDS CONTENT CB COATING

[75] Inventors: George O. Langlais; Pat Y. H. Wang; Joseph S. Chaplick, all of Nashua, N.H.

[73] Assignee: Nashua Corporation, Nashua, N.H.

[21] Appl. No.: 96,204

[22] Filed: Sep. 8, 1987

Related U.S. Application Data

[63] Continuation of Ser. No. 743,756, Jun. 12, 1985, abandoned.

[51] Int. Cl.[4] .................... C09D 11/00

[52] U.S. Cl. .................... 106/21; 106/26; 503/214; 525/54.21; 525/418

[58] Field of Search .................... 106/21, 26, 169, 170; 525/54.21, 374, 418; 427/152; 503/214, 215

[56] References Cited

U.S. PATENT DOCUMENTS

| | | | |
|---|---|---|---|
| 3,016,308 | 1/1962 | Macaulay | 117/36.1 |
| 4,271,224 | 6/1981 | Mizuno et al. | 428/207 |
| 4,339,275 | 7/1982 | Tutty | 106/21 |
| 4,348,234 | 9/1982 | Cespon | 106/21 |
| 4,352,901 | 10/1982 | Maxwell et al. | 106/21 |

FOREIGN PATENT DOCUMENTS

| | | |
|---|---|---|
| 1280769 | 7/1972 | United Kingdom . |

*Primary Examiner*—Amelia Burgess Yarbrough
*Attorney, Agent, or Firm*—Lahive & Cockfield

[57] ABSTRACT

Disclosed is a coating composition for producing a high solids content carboxymethylcellulose based "CB" coating for use in pressure sensitive carbonless copy systems. The formulation comprises carboxylmethylcellulose, a wall-forming carboxylated acrylic resin, an organic cross-linker, a polyvalent metal salt, and an oil containing color-forming dye. The composition has a solids content of at lesat 30% and a viscosity within the range of 50 to 5000 centiposes. The CB paper exhibits the ability to produce improved imaging on computer and dot matrix printers because of better release efficiency and may be manufactured using less energy.

9 Claims, 1 Drawing Sheet

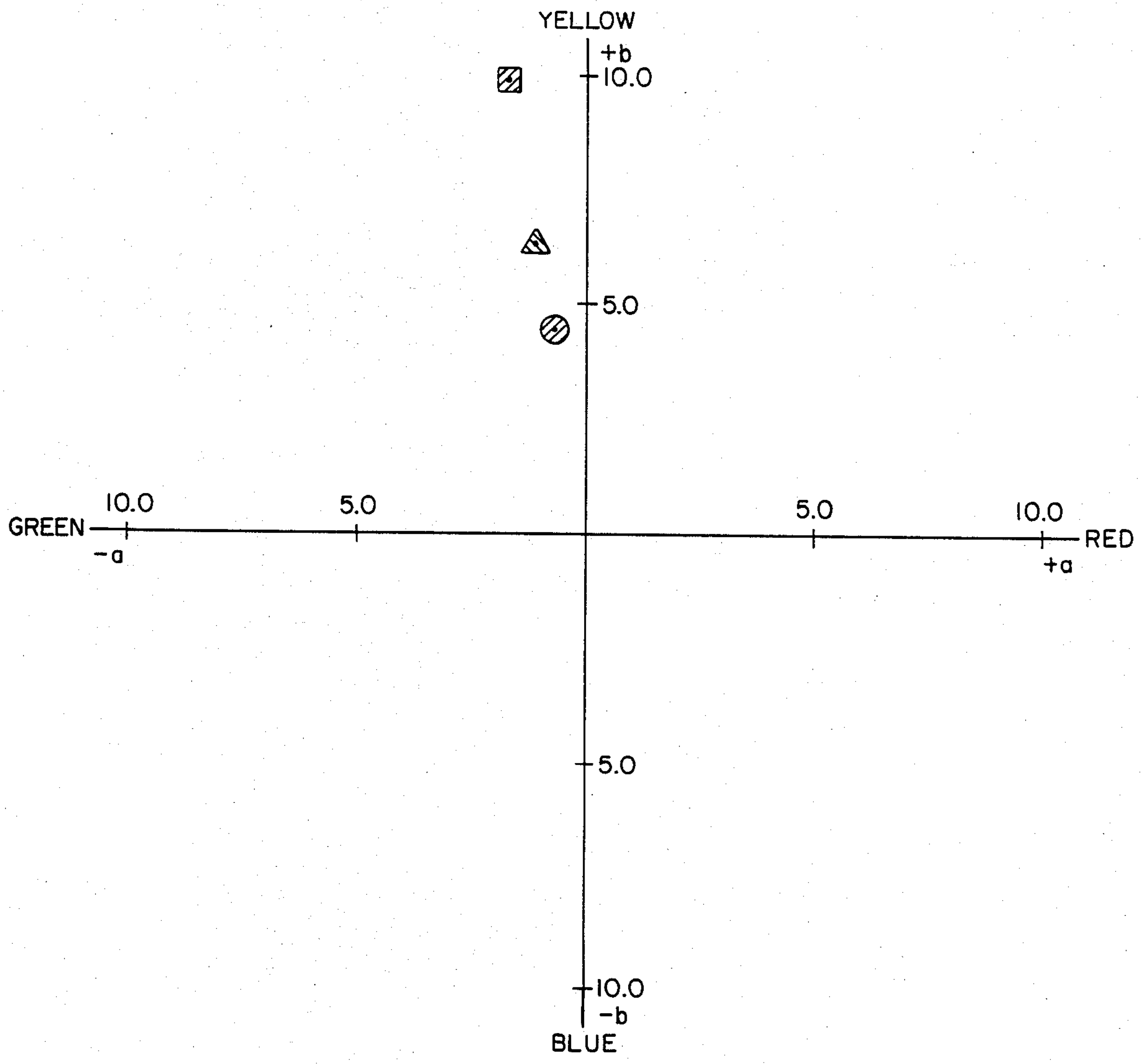
YELLOW
+b
10.0
5.0
GREEN
10.0
-a
5.0
5.0
10.0
RED
+a
5.0
10.0
-b
BLUE

HIGH SOLIDS CONTENT CB COATING

This application is a continuation of application Ser. No. 743,756, filed June 12, 1985, abandoned.

BACKGROUND OF THE INVENTION

This invention relates to the coated back (CB) component of pressure-sensitive record elements, commonly referred to as carbonless copy paper. More particularly, this invention relates to high solids content sodium carboxymethyl cellulose (CMC)-based coating formulations with efficient coating viscosity and paper coated with the formulations.

Carbonless copy paper comprises two or more juxtaposed sheets. The back surfaces of the sheets have a coating containing a color-forming material, often referred to as a coated back or "CB". The coating consists of a continuous matrix or microcapsules containing the color-forming material. The front surfaces of the receiver sheets, which in use are placed in contact with the back surfaces of the overlaid sheets, are coated with a composition containing a developer component reactive with the color-forming material. Under the application of localized pressure to the top sheet, the coatings containing the color-forming materials are ruptured thereby releasing the color-forming material to contact and react with the co-reactant or developer coating on the receiver sheets. A visible colored image is produced in areas corresponding to the locations where pressure has been applied to release the color-forming material. Therefore, the pressure applied to the top sheet causes a corresponding mark on the front of each of the other sheets of the manifold set.

The prior art discloses processes for production of coatings containing color-forming materials (also referred to as color precursors or leuco dyes) dissolved in a solvent. Previous patents, for example, U.S. Pat. No. 4,397,483, 4,082,688, and GB 1,280,769, disclose CB coatings for pressure-sensitive recording materials comprising a carboxymethylcellulose precipitate containing an oil-like solvent and a color-forming reactant. The oil containing the color-forming reactant is emulsified in an aqueous solution of sodium carboxymethylcellulose, and a metal salt is added to cause precipitation of the cellulose with droplets of the oil dye solution contained therein as an isolated phase. The resulting emulsion is coated on the back of the top sheet of a carbonless copy system and dried. Often, cross-linking resins are added to the emulsion to toughen the resulting coating.

While these coatings are commercially successful, high solids CB compositions based on previous embodiments of this technology display poor stability and unmanageable viscosities too high for coating equipment and methods now in use. Low solid content CB coatings (e.g., 20% non-aqueous components) require high energy comsumption and extensive drying time. Accordingly, it would be desirable to provide a high percent solids content CB coating with an efficient coating viscosity.

It is not possible to merely decrease the water content, thereby increasing the solids content of the known CMC-based coating composition, because this results in serious rheological problems. Aqueous solutions of CMC are characterized by viscosities which increase exponentially with increased CMC concentration. Accordingly, any advantage achieved by simply increasing the CMC content, thereby producing a coating composition which may be dried more rapidly, is offset by that composition's unacceptably high viscosity and resulting poor workability.

It is an object of this invention to provide an improved high solids content CB coating with low viscosity for better coating onto paper and other substrates. Another object is to increase drying efficiencies by providing a coating composition with a higher solids content and less water. Still another object is to increase savings in labor and energy by producing low water-content coating compositions. Another object is to achieve improved imaging on computer and dot matrix printers using pressure-sensitive paper by providing a CB paper which has improved color-former release efficiency. Another object is to produce CB coatings which are whiter in appearance. Yet another object is to decrease paper substrate distortion by wetting of fibers. Another object is to provide a CB coating that can be applied on a papermaking machine.

SUMMARY OF THE INVENTION

It has now been discovered that a high solids content CB coating with an efficient, stable coating viscosity, and improved CB products, may be prepared using certain types of CMC, together with an acrylic resin, an organic cross-linker, and a metal salt capable of inducing precipitation of the CMC. Use of formulations of the invention results in a high solids content CB coating composition, i.e., comprising non-aqueous material at levels greater than about 30% by weight, with an efficient coating viscosity which can minimize many of the formerly encountered problems of CB coating compositions.

The coatable formulation consists of an emulsion of an oil containing one or more color-forming reactants in an aqueous solution of a CMC, preferably sodium CMC, having a degree of substitution in the range of 0.65 to 1.8, a wall-forming acrylic resin, a salt of a polyvalent metal, an organic cross-linker, and other optional ingredients present together in amounts sufficient to provide a total solids content in the formulation of at least 30% by weight, preferably at least 35% by weight, and a Brookfield viscosity within the range of about 50 to about 5000 centipoises (cps), set as required for use on particular coating equipment and when coating at a selected web speed. Percents by weight solids, as used herein, include all ingredients in the formulation other than water, that is, include the oil and dissolved dye or dyes present in the coating. In the preferred embodiments, the acrylic wall-forming resin is a copolymer of a carboxylated poly ethylacrylate/methylmethacrylate copolymer, most preferably in a ratio of about 2:1 ethylacrylate to methylacrylate. The organic cross-linker is preferably a polyamide-epichlorohydrin or another resin capable of cross-linking both the CMC and the carboxylated acrylic resin. The preferred metal salt is aluminum nitrate. In the currently preferred embodiment, the CMC employed has a low viscosity (60 to 170 cps as a 6% aqueous solution) and a high degree of substitution, e.g., 1.1–1.5.

In another aspect, the invention comprises an improved CB sheet consisting of a web having an adhered, dried coating of the type described above which will release a color-former upon the application of pressure. The CB sheet is characterized by improved image intensities, lower threshold pressure, and lower cost.

BRIEF DESCRIPTION OF THE DRAWING

The sole figure of the drawing is a graph showing the reflectance readings of an uncoated paper substrate, a paper substrate coated with a prior art low solids coating composition, and a coating composition formulated in accordance with the invention. The graph illustrates the improved whiteness of CB paper made in accordance with the invention.

DESCRIPTION

According to the present invention, a low viscosity CMC having a degree of substitution between about 0.65 and 1.8 is dissolved in water. CMC is an anionic water-soluble polymer derived from cellulose. The degree of substitution is the average number of carboxymethyl groups substituted per anhydroglucose unit. A high degree of substitution improves CMC's compatibility with other water-soluble components. The CMC used in accordance with this invention is preferably an alkali metal CMC such as sodium CMC having a 1.1–1.5 degree of substitution, meaning an average of 1.1–1.5 carboxymethyl groups per anhydroglucose unit.

To this aqueous solution is added an acrylyic wall-forming resin. The preferred resin, Carboset 514H manufactured by B.F. Goodrich, is a carboxylated copolymer of poly ethylacrylate/methylmethacrylate, preferably in a ratio of about 2:1. Other resins may be used, e.g., ACRYSOL WS-24, available from Rohm & Haas, a carboxylated copolymer of polybutyl acrylate and styrene.

A solution of dyes in an oil solvent is then added to the acrylic resin—CMC solution. Suitable dyes and oil solvents are well known in the art. Preferred oil-dye solutions consist of basic, chromogenic lactone or phthalide dyes which are colorless or pale-colored and are developed on contact with acidic materials, dissolved in effective solvents such as an alkyl biphenyl. The particular dye or dyes and the particular oil or oils used do not per se form a part of this invention. However, in a preferred practice the dye or dyes employed are dissolved at concentrations of 3–12% by weight in an active oil.

To the resulting two-phase mixture is added a cross-linker, e.g., a cationic, water-soluble polyamide-epichlorohydrin resin which cross-links the carboxymethylcellulose and the carboxylated acrylic water-soluble wall-forming resin. Other useful cross-linking agents include formaldehyde-donating resins such as formaldehyde resins or melamine formaldehyde resins. Kymene 557H, which may be obtained from Hercules, Inc., is the preferred cross-linking agent. Kymene 557H is a high efficiency, cationic, wet-strength resin that functions under acid or alkaline conditions. The combination of a CMC, an acrylic resin, and such cross-linking materials creates a water-insoluble film coating with good flexibility and strength. Kymene reacts with hydroxyl and carboxyl groups, but mainly with carboxyl groups according to work reported by Hercules, Inc.

An aluminum nitrate solution (e.g., less than 5% by weight) is then added to the emulsion. Aluminum nitrate is used in this CB formulation to insolubilize CMC. Finally, a starch dispersion or a dispersion of other particles which act as a spacer material is added to the mixture.

The resulting coating formulation has a high solids content of at least 30%. Its viscosity may vary widely, and can easily be controlled for particular applications by decreasing water content and/or using a higher viscosity CMC. For air knife coating, the viscosity of the composition as measured at 100 RPMs using a Brookfield RVF viscometer, #4 spindle, is set in the range of 50–250, preferably 60–100, cps. For roll coating, the viscosity generally should be within the range of 50–120 cps; for rod coating, between 50–600 cps; and for blade coating 300–5000 cps. The particular viscosity used will necessarily depend on the coating equipment to be used and on the coating speed.

In preferred embodiments, the ratio of the internal phase of oil and dye to the external phase of CMC and organic cross-linking agent is increased relative to the prior art. For example, in a preferred CB paper of the invention, the mass of the internal phase is increased by about 35% relative to prior art coating compositions.

The formulation is coated and dried on the back of paper or another substrate, typically at a coating weight greater than about 3.00 grams per square meter (dry weight), for use in carbonless copy systems. Upon the application of pressure to the substrate, the color-forming materials are transferred by means of the oil to the underlying sheet, which contains a material reactive with the dyes, to produce a colored image corresponding to where the pressure has been applied.

Essential ingredients of the coating of the invention include CMC having a degree of substitution between 0.65 and 1.8, a wall-forming carboxylated acrylic resin, an organic cross-linker, and a metal salt. Generally, for each 100 parts (dry weight) CMC used, the composition should contain between about 50 and 200 parts acrylic resin, between 10 and 150 parts cross-linker, between 300 and 1000 parts oil and dye, and between 4.4 and 12.2 parts salt. Preferably, for each 100 parts CMC used, the wall forming resin should be present at about 60 to 100 parts, the cross-linker present at 60 to 100 parts, the oil and dye present at 600–800 parts, and the metal salt present at 5–6 parts. Spacer particles, if used as preferred, are present in the range of 100–500, preferably 200–300, parts per 100 parts CMC.

Practice of the invention results in significant advantages over previous formulations. Higher solids content, low viscosity CB coatings can be applied and dried at higher coater speeds with substantial energy savings. Coating preparation productivity is increased with the ability to produce fewer batches while maintaining the same dry coating weight. The coating has a whiter color than previous CMC based CB compositions. Lower pressure imaging can also be achieved because of improved release efficiency. In the compositions of the invention, the CMC, carboxylated acrylic, and cross-linker cooperate to enable production of aqueous coating compositions with controllable, stable rheological properties at any one of a wide range of viscosities.

The invention will be further understood from the following examples which are merely illustrative and not restrictive.

EXAMPLE 1

A high solids content blue marking CB coating composition was made according to the following procedure. All ratios are expressed as parts by weight. The following solutions were prepared.

| Substance | Parts by Weight |
|---|---|
| Preparation A | |
| $H_2O$ | 920.00 |

-continued

| Substance | Parts by Weight |
|---|---|
| Carboxymethylcellulose (1.2 DS and low viscosity)[1] Resulting solution is 8% solids. | 80.0 |
| Preparation B | |
| Oil and dye[2] Resulting solution is 4.7% dye. | 1820.0 |
| Preparation C | |
| Starch spacer dispertion[3] Resulting solution of 32.48% solids. | 1000.0 |

[1]Na—CMC 12UL available from Hercules, Inc.
[2]Preferably 820 parts deodorized kerosene, available from Penreco, and 1000 parts alkyl biphenyl (Suresol 290 available from Koch Chemical Co.) with Crystal Violet Lactone and Copikem XIV, (available from Hilton Davis Co.).
[3]Preferably comprising water; CMC-7H available from Hercules, Inc.; and starch particles (approximately 10–25 micron particle size).

120 parts carboxylated poly ethlacrylate/ methylmethacrylate copolymer (preferably Carboset 514H) is added to 1300 parts of Preparation A. To the resulting mixture is added 600 parts Preparation B, with stirring. Stirring is continued until the emulsion is completed. Next, 100 parts polyamideepichlorohydrin cross-linker (preferably Kymene 557H) is added to the emulsion. Then, 170 parts aqueous aluminum nitrate solution comprising 1.4% solids is added slowly to 1200.0 parts of the above-described emulsion, at which point the coating has a solids content of 31%, and a Brookfield viscosity of 250 cps at 100 RPMs (at a temperature of 78° F. and a pH of 5.9). The particle size of the oil droplets is 2–10 microns. Finally, adding 300 parts of Preparation C results in a coating composition having a solids content of 32% and a Brookfield viscosity of 200 cps.

EXAMPLE 2

A high solids content CB coating was made according to the following procedure.

Preparations A-C are prepared according to Example 1. 120 parts poly ethylacrylate/methylmethacrylate copolymer is added to 670 parts Preparation A. To the resulting mixture is added 600 parts Preparation B, with stirring. Next, 480 parts polyamide-epichlorohydrin cross-linker is added. Then, 190 parts aluminum ntrate comprising 1.4% solids is added slowly to 1200 parts emulsion. At this point the coating formulation has a temperature of 78° F. and a pH of 5.6, a solids content of 35%, a Brookfield viscosity of 100 cps, and an oil droplet size of 2 to 10 microns. Finally, 340 parts of Preparation C is added to the coating composition yielding a solids content of 35.4% and a Brookfield viscosity of 90 cps. After 5 to 10 minutes of mixing, the viscosity is 120 cps.

EXAMPLE 3

125 parts of carboxylated poly ethlyacrylate/methylmethacrylate copolymer is added to 765 parts of preparation A. To the resulting mixture is added 900 parts preparation B, with stirring. Next, 400 parts of polyamide-epichlorohydrin cross-linker is added. Then 160 parts of aluminum nitrate solution (1.4% solids) is added slowly to 1200 parts emulsion. At this point, the coating has a solid content of 42%, 160 cps viscosity, and a pH of 5.8 at a temperature of 78° F. The particle size of the oil droplets is 2–10 microns. Finally, 220 parts of preparation C is added to the coating composition yielding a solids content of 41% and a viscosity of 130 cps.

Laboratory airknife coater applications of the coating compositions described in the examples were made on a white paper substrate at targeted coating weights within the range of 4.8–5.2 g/m$^2$ and tested vs. a similar application of a coating composition representing the previous technology at a coating weight in the same range. By way of illustration, the results obtained with the application of the composition of Example 3 in comparison to those of the previous technology follow:

1. Color-former Release Efficiency

Strips of the sheets containing the test coatings were placed with the test coatings in juxtaposition with a developer coating on strips of receiver sheets. The two strips so assembled were then run between steel calender rolls at a fixed pressure.

Using a densitometer reflectance meter, readings were taken of the unimaged area of the receiver sheets and, 60 seconds following calendering, similar readings of the imaged area on the receiver sheet were taken. The image intensity in each case was then calculated on the following basis:

$$\text{Image intensity} = \frac{\text{Image area reading}}{\text{Unimaged area reading}} \times 100$$

(The lower the "Image Intensity" value, the denser or more intense the image.)

The results follow:

| | Image Intensity |
|---|---|
| Coating representing previous technology | 50.0 |
| "Example 3" coating | 45.6 |
| | n = 4 |

2 Coating Discoloration

Reflectance readings of the uncoated paper substrate and of the test coatings were determined using a Minolta CHROMA METER II. In each case a stack of six of the sheets was placed beneath the measuring tip, the sheets in each stack being positioned so that the sheet side of interest was towards the measuring tip.

The readings obtained follow:

| | L | a | b |
|---|---|---|---|
| Uncoated paper | +94.000 | −0.65 | +4.45 |
| Coating representing previous technology | +93.200 | −1.65 | +9.9 |
| "Example 3" coating | +93.325 | −1.15 | +6.325 |

The "a" and "b" values obtained are plotted in the enclosed figure wherein the circle symbol represents the uncoated paper, the square symbol represents the previous technology, and the triangle symbol represents the "Example 3" coating.

The data show that the "Example 3" coating is significantly closer to the white paper substrate in terms of color (as preferred) than the coating representing previous technology.

The invention may be embodied in other specific forms without departing from the spirit and scope thereof. Accordingly, other embodiments are within the following claims.

What is claimed is:

1. An aqueous, high solids content coatable formulation for application to a substrate to produce a pressure-releaseable color-former, said formulation comprising the following materials in the following parts by weight:

| Material | Parts by Weight |
| --- | --- |
| Carboxymethylcellulose | 100 |
| a salt of a polyvalent metal | 4.4-12.2 |
| a wall-forming carboxylated alkyl acrylic copolymer acrylic resin | 50-200 |
| an organic cross-linker reactive with carboxymethylcellulose and said acrylic resin | 10-150 |
| spacer particles, and | 100-500 |
| a color-forming dye dissolved in oil solvent, | 300-1,000 |

said composition having a total non-aqueous content of at least 30% by weight and a Brookfield viscosity at 78° F. of from about 50 to about 5,000 cps.

2. The formulation of claim 1 wherein the carboxymethylcellulose has a 0.65-1.8 degree of substitution and a viscosity less than 170 centipoises as a 6% by weight aqueous solution.

3. The formulation of claim 1 wherein the organic cross-linker is a polyamide-epichlorohydrin.

4. The formulation of claim 1 wherein the wall-forming acrylic copolymer is a carboxylated copolymer of poly ethylacrylate/methylmethacrylate.

5. The formulation of claim 1 wherein said viscosity is within the range of 50-250 cps.

6. The formulation of claim 1 adapted for airknife coating wherein said materials are present in amounts sufficient to provide a total non-aqueous content of at least 35% by weight, and a Brookfield viscosity within the range of 60-100 cps.

7. The formulation of claim 1 wherein the percent dye in oil in the formulation is within the range of 3% to 12%.

8. The formulation of claim 1 wherein the carboxy methyl cellulose has a 1.1-1.5 degree of substitution and a viscosity less than 170 cps as a 6% by weight aqueous solution.

9. The formulation of claim 1 comprising the following materials in the following parts by weight:

| Material | Parts by weight |
| --- | --- |
| Metal salt | 5-6 |
| Carboxymethylcellulose | 100 |
| Acylic copolymer | 60-100 |
| Cross-linker | 60-100 |
| Dye and oil | 600-800 |
| Spacer particles | 200-300 |

* * * * *

UNITED STATES PATENT AND TRADEMARK OFFICE
CERTIFICATE OF CORRECTION

PATENT NO. : 4,822,416

DATED : April 18, 1989

INVENTOR(S) : Langlais et al.

It is certified that error appears in the above-identified patent and that said Letters Patent is hereby corrected as shown below:

Column 7, line 10, delete --acrylic--, insert --acrylate--.

Column 7, line 10, delete --acrylic resin--.

Column 7, line 13, delete --acrylic resin--, insert --acrylate copolymer--.

Column 8, line 2, delete --acrylic--, insert --acrylate--.

Signed and Sealed this

Fourteenth Day of November, 1989

*Attest:*

JEFFREY M. SAMUELS

*Attesting Officer*

*Acting Commissioner of Patents and Trademarks*